(12) United States Patent
Miller et al.

(10) Patent No.: US 9,095,932 B2
(45) Date of Patent: Aug. 4, 2015

(54) METHODS OF JOINING METALLIC PROTECTIVE LAYERS

(71) Applicants: Steven A. Miller, Canton, MA (US); Leonid N. Shekhter, Ashland, MA (US); Stefan Zimmermann, Bad Saeckingen (DE)

(72) Inventors: Steven A. Miller, Canton, MA (US); Leonid N. Shekhter, Ashland, MA (US); Stefan Zimmermann, Bad Saeckingen (DE)

(73) Assignee: H.C. Starck Inc., Newton, MA (US)

( * ) Notice: Subject to any disclaimer, the term of this patent is extended or adjusted under 35 U.S.C. 154(b) by 0 days.

(21) Appl. No.: 14/293,643

(22) Filed: Jun. 2, 2014

(65) Prior Publication Data
US 2014/0311669 A1    Oct. 23, 2014

Related U.S. Application Data (63) Continuation of application No. 13/848,404, filed on Mar. 21, 2013, now Pat. No. 8,777,090, which is a continuation of application No. 13/343,113, filed on Jan. 4, 2012, now Pat. No. 8,448,840, which is a continuation of application No. 13/184,665, filed on Jul. 18, 2011, now Pat. No. 8,113,413, which is a continuation of application No. 11/638,625, filed on Dec. 13, 2006, now abandoned.

(51) Int. Cl.
  *B23K 33/00*  (2006.01)
  *B23K 31/02*  (2006.01)
  *C23C 24/04*  (2006.01)
  *B32B 38/08*  (2006.01)

(52) U.S. Cl.
  CPC ............... *B23K 31/02* (2013.01); *B32B 38/08* (2013.01); *C23C 24/04* (2013.01); *B23K 2201/18* (2013.01); *B23K 2201/34* (2013.01); *B23K 2203/04* (2013.01); *B23K 2203/16* (2013.01); *Y10T 428/12076* (2015.01); *Y10T 428/12347* (2015.01)

(58) Field of Classification Search
  CPC ........ C23C 24/04; C23C 4/12; C23C 28/023; C23C 28/321; C23C 4/04; B23K 9/23; B23K 33/004; B23K 31/02; B23K 20/08; B23K 33/00; B23K 9/0043; B23K 1/0008; B23K 20/128; B23K 2203/04; B23K 2203/18
  USPC ........... 228/165, 178, 187, 199, 107; 427/569
  See application file for complete search history.

(56) References Cited

U.S. PATENT DOCUMENTS

| 3,436,299 A | 4/1969 | Halek et al. |
| 3,990,784 A | 11/1976 | Gelber |

(Continued)

FOREIGN PATENT DOCUMENTS

| CA | 2482287 | 10/2002 |
| CN | 100364618 C | 1/2008 |

(Continued)

OTHER PUBLICATIONS

Examination Report received for Canadian Application No. 2,736,876, mailed on Jan. 23, 2013, 3 pages.

(Continued)

*Primary Examiner* — Erin Saad
(74) *Attorney, Agent, or Firm* — Morgan, Lewis & Bockius LLP (57) ABSTRACT

In various embodiments, protective layers are bonded to a steel layer, overlapped, and at least partially covered by a layer of unmelted metal powder produced by cold spray.

24 Claims, 2 Drawing Sheets

(56) References Cited

U.S. PATENT DOCUMENTS

| | | | |
|---|---|---|---|
| 4,011,981 A | 3/1977 | Danna et al. | |
| 4,050,133 A | 9/1977 | Cretella et al. | |
| 4,059,442 A | 11/1977 | Bernard | |
| 4,073,427 A | 2/1978 | Keifert et al. | |
| 4,135,286 A | 1/1979 | Wright et al. | |
| 4,140,172 A | 2/1979 | Corey | |
| 4,141,127 A | 2/1979 | Cretella et al. | |
| 4,202,932 A | 5/1980 | Chen et al. | |
| 4,209,375 A | 6/1980 | Gates et al. | |
| 4,291,104 A | 9/1981 | Keifert | |
| 4,349,954 A | 9/1982 | Banks | |
| 4,425,483 A | 1/1984 | Lee et al. | |
| 4,435,483 A * | 3/1984 | Ahslund et al. | 428/566 |
| 4,459,062 A * | 7/1984 | Siebert | 403/271 |
| 4,483,819 A | 11/1984 | Albrecht et al. | |
| 4,508,563 A | 4/1985 | Bernard et al. | |
| 4,510,171 A | 4/1985 | Siebert | |
| 4,537,641 A | 8/1985 | Albrecht et al. | |
| 4,688,691 A * | 8/1987 | Christian | 220/586 |
| 4,722,756 A | 2/1988 | Hard | |
| 4,731,111 A | 3/1988 | Kopatz et al. | |
| 4,818,629 A | 4/1989 | Jenstrom et al. | |
| 4,905,886 A | 3/1990 | Kennedy et al. | |
| 4,915,745 A | 4/1990 | Pollock et al. | |
| 4,923,531 A | 5/1990 | Fisher | |
| 4,964,906 A | 10/1990 | Fife | |
| 4,983,269 A | 1/1991 | Wegmann | |
| 5,061,527 A | 10/1991 | Watanabe et al. | |
| 5,091,244 A | 2/1992 | Biornard | |
| 5,147,125 A | 9/1992 | Austin | |
| 5,160,534 A | 11/1992 | Hiraki | |
| 5,242,481 A | 9/1993 | Kumar | |
| 5,269,899 A | 12/1993 | Fan | |
| 5,270,858 A | 12/1993 | Dickey | |
| 5,271,965 A | 12/1993 | Browning | |
| 5,302,414 A | 4/1994 | Alkhimov et al. | |
| 5,305,946 A | 4/1994 | Heilmann | |
| 5,330,798 A | 7/1994 | Browning | |
| 5,392,981 A | 2/1995 | Makowiecki et al. | |
| 5,428,882 A | 7/1995 | Makowiecki et al. | |
| 5,466,355 A | 11/1995 | Ohhashi et al. | |
| 5,554,889 A | 9/1996 | Shin et al. | |
| 5,565,071 A | 10/1996 | Demaray et al. | |
| 5,580,516 A | 12/1996 | Kumar | |
| 5,612,254 A | 3/1997 | Mu et al. | |
| 5,676,803 A | 10/1997 | Demaray et al. | |
| 5,679,473 A | 10/1997 | Murayama et al. | |
| 5,687,600 A | 11/1997 | Emigh et al. | |
| 5,693,203 A | 12/1997 | Ohhashi et al. | |
| 5,726,410 A | 3/1998 | Fukushima et al. | |
| 5,738,770 A | 4/1998 | Strauss et al. | |
| 5,766,544 A | 6/1998 | Kemp | |
| 5,795,626 A | 8/1998 | Gabel et al. | |
| 5,836,506 A | 11/1998 | Hunt et al. | |
| 5,859,654 A | 1/1999 | Radke et al. | |
| 5,863,398 A | 1/1999 | Kardokus et al. | |
| 5,954,856 A | 9/1999 | Pathare et al. | |
| 5,955,685 A | 9/1999 | Na | |
| 5,972,065 A | 10/1999 | Dunn et al. | |
| 5,993,513 A | 11/1999 | Fife | |
| 6,010,583 A | 1/2000 | Annavarapu et al. | |
| 6,030,577 A | 2/2000 | Commandeur et al. | |
| 6,071,323 A | 6/2000 | Kawaguchi | |
| 6,071,389 A | 6/2000 | Zhang | |
| 6,136,062 A | 10/2000 | Loffelholz et al. | |
| 6,139,913 A | 10/2000 | Van Steenkiste et al. | |
| 6,165,413 A | 12/2000 | Lo et al. | |
| 6,171,363 B1 | 1/2001 | Shekhter et al. | |
| 6,176,947 B1 | 1/2001 | Hwang et al. | |
| 6,189,663 B1 | 2/2001 | Smith et al. | |
| 6,197,082 B1 | 3/2001 | Dorvel et al. | |
| 6,238,456 B1 | 5/2001 | Wolf et al. | |
| 6,245,390 B1 | 6/2001 | Baranovski et al. | |
| 6,258,402 B1 | 7/2001 | Hussary et al. | |
| 6,261,337 B1 | 7/2001 | Kumar | |
| 6,267,851 B1 | 7/2001 | Hosokawa | |
| 6,269,536 B1 | 8/2001 | Balliett | |
| 6,283,357 B1 | 9/2001 | Kulkarni et al. | |
| 6,294,246 B1 | 9/2001 | Watanabe et al. | |
| 6,328,927 B1 | 12/2001 | Lo et al. | |
| 6,331,233 B1 | 12/2001 | Turner | |
| 6,408,928 B1 | 6/2002 | Heinrich et al. | |
| 6,409,897 B1 | 6/2002 | Wingo | |
| 6,409,965 B1 | 6/2002 | Nagata et al. | |
| 6,413,578 B1 | 7/2002 | Stowell et al. | |
| 6,432,804 B1 | 8/2002 | Nakata et al. | |
| 6,444,259 B1 | 9/2002 | Subramanian et al. | |
| 6,464,933 B1 | 10/2002 | Popoola et al. | |
| 6,478,902 B2 | 11/2002 | Koenigsmann et al. | |
| 6,482,743 B1 | 11/2002 | Sato | |
| 6,491,208 B2 | 12/2002 | James et al. | |
| 6,497,797 B1 | 12/2002 | Kim | |
| 6,502,767 B2 | 1/2003 | Kay et al. | |
| 6,521,173 B2 | 2/2003 | Kumar et al. | |
| 6,558,447 B1 | 5/2003 | Shekhter et al. | |
| 6,582,572 B2 | 6/2003 | McLeod | |
| 6,589,311 B1 | 7/2003 | Han et al. | |
| 6,589,377 B2 | 7/2003 | Vodermayer et al. | |
| 6,592,935 B2 | 7/2003 | Leonardi et al. | |
| 6,623,796 B1 * | 9/2003 | Van Steenkiste | 427/189 |
| 6,635,219 B2 | 10/2003 | Wen et al. | |
| 6,669,782 B1 | 12/2003 | Thakur | |
| 6,722,584 B2 | 4/2004 | Kay et al. | |
| 6,723,379 B2 | 4/2004 | Stark | |
| 6,725,522 B1 | 4/2004 | Ivanov et al. | |
| 6,743,343 B2 | 6/2004 | Kida et al. | |
| 6,743,468 B2 | 6/2004 | Fuller et al. | |
| 6,748,902 B1 | 6/2004 | Boesch et al. | |
| 6,749,002 B2 | 6/2004 | Grinberg et al. | |
| 6,749,103 B1 | 6/2004 | Ivanov et al. | |
| 6,759,085 B2 | 7/2004 | Muehlberger | |
| 6,770,154 B2 | 8/2004 | Koenigsmann et al. | |
| 6,773,969 B2 | 8/2004 | Lee et al. | |
| 6,780,458 B2 | 8/2004 | Seth et al. | |
| 6,855,236 B2 | 2/2005 | Sato et al. | |
| 6,872,425 B2 | 3/2005 | Kaufold et al. | |
| 6,872,427 B2 | 3/2005 | Van Steenkiste et al. | |
| 6,875,324 B2 | 4/2005 | Hera et al. | |
| 6,896,933 B2 | 5/2005 | Van Steenkiste et al. | |
| 6,905,728 B1 | 6/2005 | Hu et al. | |
| 6,911,124 B2 | 6/2005 | Tang et al. | |
| 6,915,964 B2 | 7/2005 | Tapphorn et al. | |
| 6,919,275 B2 | 7/2005 | Chiang et al. | |
| 6,924,974 B2 | 8/2005 | Stark | |
| 6,946,039 B1 | 9/2005 | Segal et al. | |
| 6,953,742 B2 | 10/2005 | Chen et al. | |
| 6,962,407 B2 | 11/2005 | Yamamoto et al. | |
| 6,992,261 B2 | 1/2006 | Kachalov et al. | |
| 7,041,204 B1 | 5/2006 | Cooper | |
| 7,053,294 B2 | 5/2006 | Tuttle et al. | |
| 7,066,375 B2 | 6/2006 | Bolser | |
| 7,067,197 B2 | 6/2006 | Michaluk et al. | |
| 7,081,148 B2 | 7/2006 | Koenigsmann et al. | |
| 7,101,447 B2 | 9/2006 | Turner | |
| 7,108,893 B2 | 9/2006 | Van Steenkiste et al. | |
| 7,128,988 B2 | 10/2006 | Lambeth | |
| 7,143,967 B2 | 12/2006 | Heinrich et al. | |
| 7,146,703 B2 | 12/2006 | Ivanov | |
| 7,153,453 B2 | 12/2006 | Abe et al. | |
| 7,163,715 B1 | 1/2007 | Kramer | |
| 7,164,205 B2 | 1/2007 | Yamaji et al. | |
| 7,170,915 B2 | 1/2007 | McDonald | |
| 7,175,802 B2 | 2/2007 | Sandlin et al. | |
| 7,178,744 B2 | 2/2007 | Tapphorn et al. | |
| 7,183,206 B2 | 2/2007 | Shepard | |
| 7,192,623 B2 | 3/2007 | Andre et al. | |
| 7,208,230 B2 | 4/2007 | Ackerman et al. | |
| 7,244,466 B2 | 7/2007 | Van Steenkiste | |
| 7,278,353 B2 | 10/2007 | Langan et al. | |
| 7,314,650 B1 | 1/2008 | Nanis | |
| 7,316,763 B2 | 1/2008 | Hosokawa et al. | |
| 7,335,341 B2 | 2/2008 | Van Steenkiste et al. | |
| 7,351,450 B2 | 4/2008 | Fuller et al. | |
| 7,399,335 B2 | 7/2008 | Shekhter et al. | |

(56) References Cited

U.S. PATENT DOCUMENTS

| | | |
|---|---|---|
| 7,399,355 B2 | 7/2008 | Szymanski et al. |
| 7,402,277 B2 | 7/2008 | Ayer et al. |
| 7,479,299 B2 | 1/2009 | Raybould et al. |
| 7,504,008 B2 | 3/2009 | Doan et al. |
| 7,514,122 B2 | 4/2009 | Kramer |
| 7,550,055 B2 | 6/2009 | Le et al. |
| 7,582,846 B2 | 9/2009 | Molz et al. |
| 7,618,500 B2 | 11/2009 | Farmer et al. |
| 7,635,498 B2 | 12/2009 | Sakai et al. |
| 7,644,745 B2 | 1/2010 | Le et al. |
| 7,651,658 B2 | 1/2010 | Aimone et al. |
| 7,652,223 B2 | 1/2010 | Tanase et al. |
| 7,670,406 B2 | 3/2010 | Belashchenko |
| 7,794,554 B2 | 9/2010 | Aimone et al. |
| 7,811,429 B2 | 10/2010 | Landgraf et al. |
| 7,815,782 B2 | 10/2010 | Inagawa et al. |
| 7,871,563 B2 | 1/2011 | Acker et al. |
| 7,901,552 B2 | 3/2011 | Pavloff |
| 7,910,051 B2 | 3/2011 | Zimmermann et al. |
| 7,951,275 B2 | 5/2011 | Tsukamoto |
| 8,002,169 B2 | 8/2011 | Miller et al. |
| 8,022,169 B2 | 9/2011 | Way et al. |
| 8,043,655 B2 | 10/2011 | Miller et al. |
| 8,082,768 B2 | 12/2011 | Hidaka et al. |
| 8,113,413 B2 | 2/2012 | Miller et al. |
| 8,173,206 B2 | 5/2012 | Boutwell et al. |
| 8,187,720 B2 | 5/2012 | Choi et al. |
| 8,197,661 B1 | 6/2012 | Nanis |
| 8,197,894 B2 | 6/2012 | Miller et al. |
| 8,226,741 B2 | 7/2012 | Shekhter et al. |
| 8,246,903 B2 | 8/2012 | Miller et al. |
| 8,448,840 B2 | 5/2013 | Miller et al. |
| 8,491,959 B2 | 7/2013 | Miller et al. |
| 8,703,233 B2 | 4/2014 | Miller et al. |
| 8,715,386 B2 | 5/2014 | Shekhter et al. |
| 8,734,896 B2 | 5/2014 | Volchko et al. |
| 8,777,090 B2 | 7/2014 | Miller et al. |
| 8,883,250 B2 | 11/2014 | Miller et al. |
| 8,961,867 B2 | 2/2015 | Miller et al. |
| 2001/0054457 A1 | 12/2001 | Segal et al. |
| 2002/0041819 A1 | 4/2002 | Kumar et al. |
| 2002/0066770 A1* | 6/2002 | James et al. ............... 228/119 |
| 2002/0090464 A1 | 7/2002 | Jiang et al. |
| 2002/0112789 A1 | 8/2002 | Jepson et al. |
| 2002/0112955 A1 | 8/2002 | Aimone et al. |
| 2002/0168466 A1 | 11/2002 | Tapphorn et al. |
| 2003/0019326 A1 | 1/2003 | Han et al. |
| 2003/0023132 A1 | 1/2003 | Melvin et al. |
| 2003/0052000 A1 | 3/2003 | Segal et al. |
| 2003/0082297 A1 | 5/2003 | Wolkers et al. |
| 2003/0121777 A1 | 7/2003 | Sato et al. |
| 2003/0175142 A1 | 9/2003 | Milonopoulou et al. |
| 2003/0178301 A1 | 9/2003 | Lynn et al. |
| 2003/0190413 A1 | 10/2003 | Van Steenkiste et al. |
| 2003/0219542 A1 | 11/2003 | Ewasyshyn et al. |
| 2003/0232132 A1 | 12/2003 | Muehlberger |
| 2004/0037954 A1 | 2/2004 | Heinrich et al. |
| 2004/0065545 A1 | 4/2004 | Takahashi |
| 2004/0065546 A1 | 4/2004 | Michaluk et al. |
| 2004/0076807 A1* | 4/2004 | Grinberg et al. ............... 428/212 |
| 2004/0107798 A1 | 6/2004 | Hirata et al. |
| 2004/0126499 A1 | 7/2004 | Heinrich et al. |
| 2004/0141870 A1 | 7/2004 | Michaluk et al. |
| 2004/0202885 A1 | 10/2004 | Seth et al. |
| 2004/0262157 A1 | 12/2004 | Ford et al. |
| 2005/0084701 A1 | 4/2005 | Slattery |
| 2005/0120957 A1 | 6/2005 | Kowalsky et al. |
| 2005/0142021 A1 | 6/2005 | Aimone et al. |
| 2005/0147150 A1 | 7/2005 | Wickersham et al. |
| 2005/0147742 A1 | 7/2005 | Kleshock et al. |
| 2005/0153069 A1 | 7/2005 | Tapphorn et al. |
| 2005/0155856 A1 | 7/2005 | Oda |
| 2005/0199739 A1 | 9/2005 | Kuroda et al. |
| 2005/0220995 A1 | 10/2005 | Hu et al. |
| 2005/0252450 A1 | 11/2005 | Kowalsky et al. |
| 2006/0006064 A1 | 1/2006 | Tepman |
| 2006/0011470 A1 | 1/2006 | Hatch et al. |
| 2006/0011740 A1 | 1/2006 | Bosio |
| 2006/0021870 A1 | 2/2006 | Tsai et al. |
| 2006/0027687 A1 | 2/2006 | Heinrich et al. |
| 2006/0032735 A1 | 2/2006 | Aimone et al. |
| 2006/0032737 A1 | 2/2006 | Liehr |
| 2006/0042728 A1 | 3/2006 | Lemon et al. |
| 2006/0045785 A1 | 3/2006 | Hu et al. |
| 2006/0090593 A1 | 5/2006 | Liu |
| 2006/0121187 A1 | 6/2006 | Haynes et al. |
| 2006/0129941 A1 | 6/2006 | Hollemans |
| 2006/0137969 A1 | 6/2006 | Feldewerth et al. |
| 2006/0175198 A1 | 8/2006 | Vermeersch et al. |
| 2006/0207876 A1 | 9/2006 | Matsumura et al. |
| 2006/0251872 A1 | 11/2006 | Wang et al. |
| 2006/0266639 A1 | 11/2006 | Le et al. |
| 2006/0289305 A1 | 12/2006 | White |
| 2007/0012557 A1 | 1/2007 | Hosokawa et al. |
| 2007/0089984 A1 | 4/2007 | Gaydos et al. |
| 2007/0116886 A1 | 5/2007 | Refke et al. |
| 2007/0116890 A1 | 5/2007 | Adams et al. |
| 2007/0125646 A1 | 6/2007 | Young et al. |
| 2007/0172378 A1 | 7/2007 | Shibuya et al. |
| 2007/0183919 A1 | 8/2007 | Ayer et al. |
| 2007/0187525 A1 | 8/2007 | Jabado et al. |
| 2007/0196570 A1 | 8/2007 | Gentsch et al. |
| 2007/0240980 A1 | 10/2007 | Chu et al. |
| 2007/0241164 A1 | 10/2007 | Barnes et al. |
| 2007/0251814 A1 | 11/2007 | Beele et al. |
| 2007/0251820 A1 | 11/2007 | Nitta et al. |
| 2007/0269608 A1 | 11/2007 | Saito et al. |
| 2007/0289689 A1 | 12/2007 | Sugimoto et al. |
| 2007/0289864 A1 | 12/2007 | Ye et al. |
| 2007/0289869 A1 | 12/2007 | Ye et al. |
| 2008/0028459 A1 | 1/2008 | Suh et al. |
| 2008/0041720 A1 | 2/2008 | Kim et al. |
| 2008/0063889 A1 | 3/2008 | Duckham et al. |
| 2008/0078268 A1 | 4/2008 | Shekhter et al. |
| 2008/0110746 A1 | 5/2008 | Kardokus et al. |
| 2008/0145688 A1 | 6/2008 | Miller et al. |
| 2008/0171215 A1 | 7/2008 | Kumar et al. |
| 2008/0173542 A1 | 7/2008 | Neudecker et al. |
| 2008/0216602 A1 | 9/2008 | Zimmermann et al. |
| 2008/0271779 A1 | 11/2008 | Miller et al. |
| 2009/0004379 A1 | 1/2009 | Deng et al. |
| 2009/0010792 A1 | 1/2009 | Yi et al. |
| 2009/0022616 A1 | 1/2009 | Acker et al. |
| 2009/0159433 A1 | 6/2009 | Neudecker et al. |
| 2009/0173626 A1 | 7/2009 | Duckham et al. |
| 2009/0214374 A1 | 8/2009 | Ivanov |
| 2009/0239754 A1 | 9/2009 | Kruger et al. |
| 2009/0291851 A1 | 11/2009 | Bohn et al. |
| 2010/0000857 A1 | 1/2010 | Tonogi et al. |
| 2010/0015467 A1 | 1/2010 | Zimmermann et al. |
| 2010/0055487 A1 | 3/2010 | Zimmermann et al. |
| 2010/0061876 A1 | 3/2010 | Miller et al. |
| 2010/0084052 A1 | 4/2010 | Farmer et al. |
| 2010/0086800 A1 | 4/2010 | Miller et al. |
| 2010/0136242 A1 | 6/2010 | Kay et al. |
| 2010/0172789 A1 | 7/2010 | Calla et al. |
| 2010/0189910 A1 | 7/2010 | Belashchenko et al. |
| 2010/0246774 A1 | 9/2010 | Lathrop |
| 2010/0252418 A1 | 10/2010 | McCabe et al. |
| 2010/0272889 A1 | 10/2010 | Shekhter et al. |
| 2011/0127162 A1 | 6/2011 | King et al. |
| 2011/0132534 A1 | 6/2011 | Miller et al. |
| 2011/0256013 A1 | 10/2011 | Yamamoto et al. |
| 2011/0297535 A1 | 12/2011 | Higdon et al. |
| 2011/0300396 A1 | 12/2011 | Miller et al. |
| 2011/0303535 A1 | 12/2011 | Miller et al. |
| 2012/0000594 A1 | 1/2012 | Ivanov et al. |
| 2012/0017521 A1 | 1/2012 | Botke |
| 2012/0061235 A1 | 3/2012 | Feldman-Peabody |
| 2012/0251714 A1 | 10/2012 | Miller et al. |
| 2012/0291592 A1 | 11/2012 | Shekhter et al. |
| 2012/0315387 A1 | 12/2012 | Miller et al. |
| 2013/0081943 A1 | 4/2013 | Loewenthal et al. |
| 2013/0081944 A1 | 4/2013 | Dary et al. |

(56) References Cited

U.S. PATENT DOCUMENTS

| | | |
|---|---|---|
| 2013/0082033 A1 | 4/2013 | Volchko et al. |
| 2013/0156967 A1 | 6/2013 | Michaluk et al. |
| 2013/0264013 A1 | 10/2013 | Miller et al. |
| 2013/0302519 A1 | 11/2013 | Miller et al. |
| 2013/0337159 A1 | 12/2013 | Miller et al. |
| 2015/0034477 A1 | 2/2015 | Miller et al. |

FOREIGN PATENT DOCUMENTS

| | | |
|---|---|---|
| CN | 104040020 A | 9/2014 |
| DE | 10253794 A1 | 6/2004 |
| EP | 0074803 | 3/1983 |
| EP | 0212929 A2 | 3/1987 |
| EP | 0484533 A1 | 5/1992 |
| EP | 0774315 A2 | 5/1997 |
| EP | 0911426 A1 | 4/1999 |
| EP | 1066899 | 1/2001 |
| EP | 1138420 A2 | 10/2001 |
| EP | 1314795 A1 | 5/2003 |
| EP | 1350861 | 10/2003 |
| EP | 1382720 A2 | 1/2004 |
| EP | 1398394 | 3/2004 |
| EP | 1413642 | 4/2004 |
| EP | 1452622 | 9/2004 |
| EP | 1200218 B1 | 7/2005 |
| EP | 1556526 A2 | 7/2005 |
| EP | 1639620 A2 | 3/2006 |
| EP | 1672175 A1 | 6/2006 |
| EP | 1715080 | 10/2006 |
| EP | 1728892 A2 | 12/2006 |
| EP | 2135973 A1 | 12/2009 |
| EP | 2145976 A1 | 1/2010 |
| EP | 2206804 A1 | 7/2010 |
| EP | 2278045 A1 | 1/2011 |
| EP | 2328701 A4 | 4/2013 |
| EP | 2706129 A1 | 3/2014 |
| EP | 2818577 A1 | 12/2014 |
| GB | 2121441 | 12/1983 |
| GB | 2394479 | 4/2004 |
| JP | 54067198 | 5/1979 |
| JP | 59-20470 A | 2/1984 |
| JP | 62-230967 A | 10/1987 |
| JP | 63-100177 U | 6/1988 |
| JP | 63-35769 Y2 | 9/1988 |
| JP | 63-227774 A | 9/1988 |
| JP | 64-15353 A | 1/1989 |
| JP | 1-98359 A | 4/1989 |
| JP | 3197640 | 8/1991 |
| JP | 4-323366 A | 11/1992 |
| JP | 5-15915 U | 3/1993 |
| JP | 5-232580 A | 9/1993 |
| JP | 6-144124 A | 5/1994 |
| JP | 6-158300 A | 6/1994 |
| JP | 6-346232 A | 12/1994 |
| JP | 06346232 | 12/1994 |
| JP | 7-228966 A | 8/1995 |
| JP | 10-275887 A | 10/1998 |
| JP | 11-69637 A | 3/1999 |
| JP | 11-256323 A | 9/1999 |
| JP | 11-269637 A | 10/1999 |
| JP | 11269639 | 10/1999 |
| JP | 11-312484 A | 11/1999 |
| JP | 2000-256843 A | 9/2000 |
| JP | 2001-98359 A | 4/2001 |
| JP | 2001-107228 A | 4/2001 |
| JP | 01/131767 | 5/2001 |
| JP | 2001-123267 A | 5/2001 |
| JP | 2003-201561 A | 7/2003 |
| JP | 2003-226966 A | 8/2003 |
| JP | 03/301278 | 10/2003 |
| JP | 2004-523653 A | 8/2004 |
| JP | 2004-307969 A | 11/2004 |
| JP | 2005-29858 A | 2/2005 |
| JP | 3-108347 U | 4/2005 |
| JP | 2005-095886 A | 4/2005 |
| JP | 2005-232580 A | 9/2005 |
| JP | 2006-052440 A | 2/2006 |
| JP | 2006-144124 A | 6/2006 |
| JP | 2006-161161 A | 6/2006 |
| JP | 2007-076705 A | 3/2007 |
| JP | 2007-146281 A | 6/2007 |
| JP | 2008-169464 A | 7/2008 |
| JP | 2008-540823 A | 11/2008 |
| JP | 2009-221543 A | 10/2009 |
| JP | 2013-224495 A | 10/2013 |
| JP | 2015-505907 A | 2/2015 |
| KR | 10-0683124 B1 | 2/2007 |
| KR | 10-2008-0006624 A | 1/2008 |
| KR | 10-2010-0108673 A | 10/2010 |
| RU | 2166421 | 5/2001 |
| WO | 93/19220 A1 | 9/1993 |
| WO | 96/33294 A1 | 10/1996 |
| WO | 98/37249 A1 | 8/1998 |
| WO | 00/06793 A1 | 2/2000 |
| WO | 01/012364 A1 | 2/2001 |
| WO | 02/064287 A2 | 8/2002 |
| WO | WO-02/070765 | 9/2002 |
| WO | WO-03/062491 | 7/2003 |
| WO | 03/106051 A1 | 12/2003 |
| WO | 03/106733 A1 | 12/2003 |
| WO | 2004/009866 A2 | 1/2004 |
| WO | 2004/076706 A2 | 9/2004 |
| WO | WO-2004/074540 | 9/2004 |
| WO | 2004/114355 A2 | 12/2004 |
| WO | WO-2005/073418 | 8/2005 |
| WO | 2005/084242 A2 | 9/2005 |
| WO | WO-2005/079209 | 9/2005 |
| WO | 2006/117144 A1 | 11/2006 |
| WO | WO-2006/117145 | 11/2006 |
| WO | 2006/129941 A1 | 12/2006 |
| WO | WO-2007/001441 | 1/2007 |
| WO | 2008/033192 A1 | 3/2008 |
| WO | 2008/042947 A2 | 4/2008 |
| WO | WO-2008/063891 | 5/2008 |
| WO | 2008/081585 A1 | 7/2008 |
| WO | WO-2008/089188 | 7/2008 |
| WO | 2009/012278 A1 | 1/2009 |
| WO | 2012/074609 A1 | 6/2012 |

OTHER PUBLICATIONS

Examination Report received for Chinese Application No. 2007800364699, mailed on Sep. 7, 2010, 9 pages (6 Pages of English Translation & 3 pages of Official Copy).

Examination Report received for Japanese Application No. 2010-506677, mailed on Jun. 26, 2012, 10 pages (6 Pages of English Translation & 4 pages of Official Copy).

Examination Report received for Japanese Application No. 2011-526142, mailed on Feb. 13, 2013, 12 pages (7 pages of English Translation & 5 pages of Official copy).

Examination Report received for European Application No. 07843733.2 mailed on Oct. 11, 2013, 4 pages.

Examination Report received for European Patent Application No. 09813462.0, mailed on Oct. 1, 2013, 4 pages.

Extended European Search Report received for European Patent Application No. 13184639.6, mailed on Feb. 10, 2014, 6 pages.

Examination Report received for European Patent Application No. 09813462.0, mailed on Feb. 6, 2014, 4 pages.

Examination Report received for Japanese Patent Application No. 2009-232394, mailed on Jan. 27, 2014, 9 pages of English Translation only.

Examination Report received for Japanese Patent Application No. 2009-232394 mailed on Sep. 24, 2013, 8 pages of English Translation only.

Kwon et al., "Particle Behavior in Supersonic Flow During the Cold Spray Process", Metals and Materials International, vol. 11, No. 5, 2005, pp. 377-381.

Examination Report received for Korean Application No. 10-2009-7025319 mailed on Dec. 2, 2013, 5 pages (2 pages of English Translation & 3 pages of Official Copy).

(56) References Cited

OTHER PUBLICATIONS

International Search Report received for PCT International Serial No. PCT/JP2012/057434, mailed on Jun. 19, 2012, 5 pages (2 pages of English Translation and 3 pages of Search Report).

International Preliminary Report on Patentability received for PCT Patent Application No. PCT/US2012/057434, mailed on Apr. 10, 2014, 12 pages.

International Preliminary Report on Patentability received for PCT Patent Application No. PCT/US2012/069401, mailed on Jun. 26, 2014, 7 pages.

International Search Report and Written Opinion received for PCT Patent Application No. PCT/US2012/069401, mailed on Mar. 20, 2013, 9 pages.

Notice of Allowance Received for Korean Patent Application No. KR 10-2009-0094709, mailed on Jul. 29, 2014, 3 pages (1 page of English Translation & 2 pages of official copy).

Extended European Search Report received for European Patent Application No. 09813462.0, mailed on Mar. 8, 2013, 5 pages.

Extended European Search Report received for European Patent Application No. 14166073.8, mailed on Dec. 3, 2014, 7 pages.

"Cold Gas Dynamic Spray CGSM Apparatus," Tev Tech LLC, available at: http://www.tevtechllc.com/cold_gas.html (accessed Dec. 14, 2009).

"Cold Spray Process," Handbook of Thermal Spray Technology, ASM International, Sep. 2004, pp. 77-84.

Ajdelsztajn et al., "Synthesis and Mechanical Properties of Nanocrytalline Ni Coatings Producted by Cold Gas Dynamic Spraying," 201 Surface and Coatings Tech. 3-4, pp. 1166-1172 (Oct. 2006).

Gärtner et al., "The Cold Spray Process and its Potential for Industrial Applications," 15 J. of Thermal Sprsy Tech. 2, pp. 223-232 (Jun. 2006).

Hall et al., "The Effect of a Simple Annealing Heat Treatment on the Mechanical Properties of Cold-Sprayed Aluminum," 15 J. of Thermal Spray Tech. 2, pp. 233-238 (Jun. 2006).

Hall et al., "Preparation of Aluminum Coatings Containing Homogeneous Nanocrystalline Microstructures Using the Cold Spray Process," JTTEES 17:352-359.

IPRP in International Patent Application No. PCT/EP2006/003967, dated Nov. 6, 2007 (15 pages).

IPRP in International Patent Application No. PCT/US2008/062434, dated Nov. 10, 2009 (21 pages).

IPRP in International Patent Application No. PCT/EP2006/003969, mailed dated Nov. 6, 2007 (13 pages).

International Search Report and Written Opinion in International Patent Application No. PCT/US2007/087214, mailed Mar. 23, 2009 (13 pages).

IPRP in International Patent Application No. PCT/US2007/081200, dated Sep. 1, 2009 (17 pages).

IPRP in International Patent Application No. PCT/US2007/080282, dated Apr. 7, 2009 (15 pages).

Irissou et al., "Review on Cold Spray Process and Technology: Part I—Intellectual Property," 17 J. of Thermal Spray Tech. 4, pp. 495-516 (Dec. 2008).

Karthikeyan, "Cold Spray Technology: International Status and USA Efforts," ASB Industries, Inc. (Dec. 2004).

Li et al., "Effect of Annealing Treatment on the Microstructure and Properties of Cold-Sprayed Cu Coating," 15 J. of Thermal Spray Tech. 2, pp. 206-211 (Jun. 2006).

Marx et al., "Cold Spraying Innovative Layers for New Applications," 15 J. of Thermal Spray Tech. 2, pp. 177-183 (Jun. 2006).

Morito, "Preparation and Characterization of Sintered Mo-Re Alloys," 3 J. de Physique 7, Part 1, pp. 553-556 (1993).

Search Report in European Patent Application No. 09172234.8, dated Jan. 29, 2010 (7 pages).

Stoltenhoff et al., "An Analysis of the Cold Spray Process and its Coatings," 11 J. of Thermal Spray Tech. 4, pp. 542-550 (Dec. 2002).

Van Steenkiste et al., "Analysis of Tantalum Coatings Produced by the Kinetic Spray Process," 13 J. of Thermal Spray Tech. 2, pp. 265-273 (Jun. 2004).

Examination Report in European Patent Application No. 09172234.8, mailed Jun. 16, 2010 (3 pages).

Kosarev et al., "Recently Patent Facilities and Applications in Cold Spray Engineering," Recent Patents on Engineering, vol. 1 pp. 35-42 (2007).

Examination Report in European Patent Application No. 07843733.2, mailed Nov. 30, 2010 (9 pages).

English Translation of Office Action mailed Feb. 23, 2011 for Chinese Patent Application No. 200880023411.5 (4 pages).

Examination Report in European Patent Application No. 08755010.9, mailed Sep. 16, 2011 (3 pages).

Examination Report in Canadian Patent Application No. 2,736,876, mailed Feb. 29, 2012 (4 pages).

Tapphorn et al., "The Solid-State Spray Forming of Low-Oxide Titanium Components," JOM, p. 45-47 (1998).

Examination Report Received for Japanese Patent App. No. 2013-266839 mailed on Oct. 22, 2014, 7 pages (4 pages of English Translation & 3 pages of Official copy).

* cited by examiner

METHODS OF JOINING METALLIC PROTECTIVE LAYERS

CROSS-REFERENCE TO RELATED APPLICATIONS

This application is a continuation of U.S. patent application Ser. No. 13/848,404, filed on Mar. 21, 2013, which is a continuation of U.S. patent application Ser. No. 13/343,113, filed on Jan. 4, 2012, now U.S. Pat. No. 8,448,840, which is a continuation of U.S. patent application Ser. No. 13/184,665, filed on Jul. 18, 2011, now U.S. Pat. No. 8,113,413, which is a continuation of U.S. patent application Ser. No. 11/638,625, filed on Dec. 13, 2006, now abandoned, the content of each of which is incorporated by reference herein in its entirety.

BACKGROUND OF THE INVENTION

Tantalum is a highly corrosion resistant, bio-friendly metal. As a result it finds wide use in reactors, heat exchangers, piping and the like in the chemical and pharmaceutical processing industries. Because tantalum is very expensive often the structural components used in this equipment are made up of a steel or stainless steel section for strength purposes that is clad with a thin sheet of tantalum to prevent interaction with the process fluid. In order for the tantalum sheet to provide corrosion protection for a whole vessel many such sheets must be joined together into a single impermeable piece. Many techniques have been used but all of them are costly, have severe deficiencies, and cause the cost of the basic tantalum clad steel section to be higher than necessary. This invention provides a low cost, chemical resistant, material and manpower efficient means of joining the tantalum sheets together.

Cold spray or kinetic spray (see U.S. Pat. Nos. 5,302,414, 6,502,767 and 6,759,085) is an emerging industrial technology that is being employed to solve many industrial manufacturing challenges (see, e.g., U.S. Pat. Nos. 6,924,974, 6,444,259, 6,491,208 and 6,905,728). Cold spray employs a high velocity gas jet to rapidly accelerate powder particles to high velocity such that when they impact a surface the particles bond to the surface to form an integral, well bonded and dense coating. The cold spraying of tantalum powders onto a variety of substrates (including steel) has been suggested (see, e.g., "Analysis of Tantalum Coatings Produced by the Kinetic Spray Process," Van Steenkiste et al, Journal of Thermal Spray Technology, volume 13, number 2, June 2004, pages 265-273; "Cold spraying—innovative layers for new applications," Marx et al, Journal of Thermal Spray Technology, volume 15, number 2, June 2006, pages 177-183; and "The Cold Spray Process and Its Potential for Industrial Applications," Gärtner et al, Journal of Thermal Spray Technology, volume 15, number 2, June 2006, pages 223-232). This is all accomplished without having to heat the tantalum powder to a temperature near or above its melting point as is done with traditional thermal spray processes. The fact that dense coatings can be formed at low temperatures present many advantages. Such advantages include reduced oxidation, high density deposits, solid state compaction, the lack of thermally induced stresses and particularly, in this case, the lack of substrate heating. This is critical because at elevated temperatures, such as in a molten Ta weld pool, Ta can dissolve the elemental components of steels and stainless steels with the result that brittle and non corrosion resistant phases form in the tantalum.

As mentioned above, tantalum is a preferred corrosion resistant material in industries that process chemically aggressive liquids. Because of tantalum's high cost rather than being used as a thick structural member, it is frequently used in thin layers as a protective cladding on steel or stainless steel. Many techniques have been developed to attach tantalum clad to the substrate material such as high temperature brazing (U.S. Pat. No. 4,291,104), low temperature soldering (U.S. Pat. No. 4,011,981), diffusion bonding (U.S. Pat. No. 5,693,203), explosive bonding (U.S. Pat. No. 4,291,104), and flouroelastomers (U.S. Pat. No. 4,140,172).

The fabrication problem becomes difficult and expensive however when the individually clad components must be joined together to form a fully functional vessel such as a process reactor. The clad must be fused together to prevent the process liquid from contacting the steel, the steel must also be fused to provide strength to the entire structure. Dissolution of the steel into the tantalum during either fusion process would immediately destroy the desirable properties of tantalum. Thus, all high temperature fusion processes require and use elaborate joint designs and fabrication techniques in order to prevent the tantalum from reaction with the steel during the fusion process.

U.S. Pat. No. 4,073,427 solves the problem of joining the sheets by providing a machined groove around the entire perimeter of all of the structural parts to be joined. The structural steel is then welded and a machined tantalum batten is inserted in the groove to isolate the tantalum from the steel when the tantalum is welded. The tantalum sheet can then be bent flat (it has to be bent up initially to allow insertion of the batten) and the final tantalum weld performed. Further due to the high temperatures involved purge holes must be provided in the steel element to allow for the introduction of inert gases to protect the final tantalum weld.

U.S. Pat. No. 4,818,629 provides a similar approach except that three battens are used, one steel and two tantalum battens. This approach requires two welds as well as multiple purge holes drilled in the steel backing sheet.

U.S. Pat. No. 5,305,946 attempts to improve on the above processes by providing a wide single batten that completely fills the gap between the two tantalum sheets and then double welding a tantalum closure across the top of the tantalum sheets. All of the references discussed so far are done so in terms of joining flat sections. The problems become far more difficult when welding rings to rings to form long vessels, or domes to rings to provide a pressure closure or even vessel penetrations for piping. Bending the tantalum sheet in a circular pattern, then bending 90 degrees out of the plane of the circle, inserting the batten and bending the two tantalum sheets flat again is time consuming and difficult.

U.S. Pat. No. 4,459,062 describes a process using a plasma arc spray overlay to cover the contaminated weld of the tantalum protective layer. First the steel is welded to itself and then the tantalum is welded to itself. Because the tantalum is in intimate contact with the steel, the steel contaminates the tantalum weld and the corrosion resistance of the weld is greatly reduced. A high temperature plasma arc spray is used to provide a protective layer of tantalum over the contaminated weld. Because these joints are used on large structures they usually must be made in air, thus the hot plasma arc causes both the tantalum sheet and the tantalum powder to oxidize due to the plasma's very high temperature. The result is a porous, lamellar structure in the deposit that is high in oxygen content. The porosity and porous grain boundaries greatly reduce the corrosion resistance by percolation effects and the high oxygen content results in a less ductile (than the tantalum sheet) deposit that is prone to cracking and can fail during operation. Additionally, because the coating is put down hot, and because the coefficient of thermal expansion for tantalum is almost double that of steel, as the structure cools the brittle plasma spray deposit is put in a state of tensile stress, a stress that potentially can lead to cracking and failure of the coating.

U.S. Pat. No. 6,749,002 describes a method of spray joining articles. The patent indicates that cold spray as well as the many types of hot spray forming techniques (such as plasma and twin wire arc spraying) could be used. However, the method is severely limited in that at least one of the articles must be a spray formed steel article and the sprayed particles must be steel particles. Clearly this method is used for making structural steel joints involving at least one steel component. In the invention described below the structural steel joint is provided by traditional welding techniques. In fact there is no desire or requirement that the sprayed material join to the steel. In the present invention, the cold sprayed material, in this case tantalum, is used to join the tantalum surface coating and to provide an impermeable corrosion resistant layer of tantalum between two or more co-existing Ta sheets.

U.S. Pat. No. 6,258,402 is even more limited in that it describes a method for repairing spray formed steel tooling. It too requires a steel spray formed part on which a steel spray formed coating will be used to fill a region which has been damaged or somehow eroded away. Additionally, once the spray forming is complete, the spray formed filler is melted and fused using conventional electric welding processes. The purpose of the invention below is to avoid heating and especially melting of the tantalum during the joining processes.

DESCRIPTION OF THE INVENTION

The present invention is broadly directed to a process for joining tantalum clad steel structures comprising:
a) providing a first tantalum clad section, said first tantalum clad section comprising a tantalum layer over a steel layer, with a bonding layer optionally therebetween, with a portion of said steel layer in an edge region not being covered by said tantalum layer or said bonding layer,
b) providing a second tantalum clad section, said second tantalum clad section comprising a tantalum layer over a steel layer, with a bonding layer optionally therebetween, with a portion of said steel layer in an edge region not being covered by said tantalum layer or said bonding layer,
c) locating said steel edge regions adjacent each other,
d) welding the steel edge regions together,
e) cold spraying a tantalum powder onto the welded edge regions and over the tantalum layers adjacent said edge regions thereby joining the tantalum clad steel sections.

The invention is also directed to a tantalum weld or joint, wherein the weld or joint is formed by cold spraying tantalum powder and consists of elongated tantalum powder particles, elongated normal to the direction of the spray direction, and wherein the powdered particles have a random crystallographic orientation. The invention is also directed to a tantalum weld or joint, wherein the weld or joint is formed by cold spraying tantalum powder followed by heta treatment and consists of equiaxed grains of approximately the same size as or smaller than the sprayed powder and wherein the grains have a random crystallographic orientation.

In one embodiment, a double sided lap joint may be used, although a single sided lap joint may be employed as well.

In one preferred embodiment, each tantalum clad section is produced by cold spraying tantalum powder directly onto the respective steel layer in a pattern such that a portion of each steel layer in an edge region is not sprayed and is thus left exposed. This embodiment does, not require the use of a bonding layer.

Local failures can develop in tantalum clad vessels and do occur frequently. A local failure is when the bulk of the cladding is fine, but a small crack or pinhole may have developed in the clad. This can result from a manufacturing defect (e.g., a gouged tantalum layer, a weld defect or an inclusion), a local hot spot or improper process chemistry. The normal procedure is to enter the vessel, cut out the defect and then weld a patch on top. Of course in doing this there is the risk of overheating the tantalum layer and oxidizing it or causing an undesirable reaction with the steel below the weld. Although not a part of this invention, cold spray could be used to repair these defects without incurring any of the risks just mentioned.

As used herein, the term "steel" is intended to include both steel and stainless steel.

This invention, the cold welding of the tantalum sheet using cold spray technology, forms a high density, low cost, corrosion resistant joint free from the deleterious phase mentioned above. It further allows the joining of clad steel parts where the tantalum clad to steel bonding agent is a low melting temperature solder, brazing material or even a structural adhesive.

By following the present invention, the tantalum layer and the steel substrate require no special machining to provide locations for the insertion of protective battens, since battens are not used. Obviously, machining of battens or other protective strips is not required.

In the preferred embodiment, the protective cladding can be simply cut with either a straight or beveled edge such that the desired amount of steel substrate is left exposed prior to bonding of the cladding to the plate. This eliminates the many folding and unfolding operations used with cladding that must be joined by elevated temperature processes such as welding. A separate bonding or brazing layer may or may not be present depending on how the tantalum is bonded to steel. The clad sections may simply be placed together and the structural steel butt welded to form a single unit. The resultant seam is then filled, and cold welded together by cold spraying tantalum powder into the seam and over the edges of the tantalum clad layer.

Because the cold spray process is done at low temperatures, there is no harmful dissolution of the steel into the cold sprayed tantalum joint. The tantalum joint is fully dense with no porosity or oxygen pick up which would impair the joints performance. Furthermore, there are no thermally induced stresses at the joint after fabrication that could lead to separation, buckling or cracking. Stress is an issue with all high temperature joining processes due to the large differences in thermal expansion between tantalum (LCTE=$6.5 \times 10^{-6}$ cm (cm °C.)$^{-1}$ and steel (LCTE=$11.7 \times 10^{-6}$ cm (cm °C.)$^{-1}$ In fact to completely eliminate thermal stress during operation, the spraying could be done while the components are held at operational temperatures of less than 250° C.

The present invention also raises the potential for greatly decreasing the cost of the basic tantalum clad steel component. Since the joining of the tantalum layer is done at low temperatures, there is no potential for burn through of the cladding as with high temperature processes that melt the clad to form a fusion joint. Thus, reliable cold joining on tantalum cladding of very low thicknesses is possible. By following the present invention, it is possible to use thickeness of the tantalum clad as low as about 0.005 inches (preferably from about 0.005 inches to about 0.040 inches, more preferably from about 0.005 inches to about 0.020 inches, and most preferably from about 0.005 inches to about 0.010 inches). This can result in the use of substantially thinner cladding and a proportionate cost savings when compared to welding techniques that require substantially thicker cladding for reliable "in the field" welds (normal welding techniques require that the clad be around 0.02 inches, while explosive bonding requires thicknesses of 0.04 inches).

Since the process operates at relatively low temperatures, low cost techniques can be employed to bond the clad to the steel substrate, such as using structural adhesives and non-noble metal low temperature solders. Both of these approaches eliminate the need for large high temperature (~1000° C.) vacuum furnaces, the attendant energy and labor costs of heating large structural pieces to high temperature and the use of expensive noble metal brazes or silver solders. Structural adhesives decompose around 300° C. and low temperature solders melt around 400° C. The need to weld, i.e., exceed the melting point of tantalum (2998° C.), or to use plasma arc spray (the lowest temperatures are typically in excess of 3000° C.) precludes the use of low temperature bonding of the cladding to the steel since the high temperature process for the clad to clad joint would destroy the bond. Cold spray does not have this problem and could be used to join an entirely new class of low cost clad materials. Most tantalum process applications operate at temperatures of less than 250° C. and thus allow for the use of the above discussed bonding agents.

As is known in the art, various gas/powder velocities can be used in the cold spray process. Generally these velocities are in the range of from 300 to 2,000 meters/second. It is generally advantageous for the powder particles to be available in an amount in the stream, which guarantees a flow rate density of the particles from 0.01 to 100 grams/(second cm$^2$) preferably from 0.01 grams/(second cm$^2$) up to 20 grams/(second cm$^2$) and most preferably from of 0.05 grams/(second cm$^2$) up to 17 grams/(second cm$^2$). The flow rate density is calculated according to the formula $F=m/[(\pi/4)*D^2]$ with F=flow rate density, D=nozzle diameter in cm and m=powder delivery rate (in grams per second).

Generally, a stable gas such as nitrogen, or an inert gas such as argon or helium is used as the gas with which the metal powder forms the gas/powder mixture.

Finally, the process may be used to join many types of metals used as protective cladding such as niobium, titanium, zirconium, molybdenum and tungsten.

Figure 1:
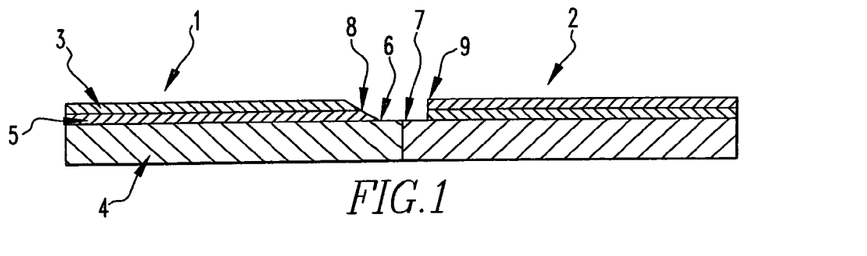
FIG. 1 shows the tantalum clad sections before joining.

In the Figures, the same numbers are used to identify the same element. In FIG. 1, two sections, 1 and 2, are placed adjacent each other. Each section has a tantalum layer 3, over a steel layer 4, with a bonding or brazing layer 5 therebetween. Each section has a portion (6 and 7) of the steel layer that is not covered (these exposed sections are only identified by number in FIG. 1—but are shown in each figure). In the left hand section, the portion is exposed via a beveled edge 8, while in the right section, the portion is exposed via a straight edge 9. The beveled edge embodiment is generally preferred.

Processes for the production of tantalum clad steel are known in the art. If desired, tantalum could be cold sprayed onto the steel (thus eliminating the need for a bonding or brazing layer). The spray configuration could be such that edge portions of the steel would be left uncoated. Alternatively, portions of the tantalum layer and, if present, the bonding or brazing layer could be removed to expose the steel edge portions.

Figure 2:
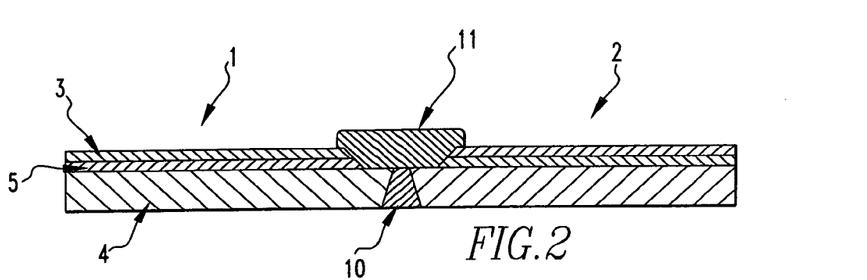
FIG. 2 shows the sections joined together.

As shown in FIG. 2, the exposed portions of the steel are welded 10 and a tantalum powder, 11, is sprayed over the welded edges as well over the tantalum layer adjacent to the exposed portions.

Figure 3:
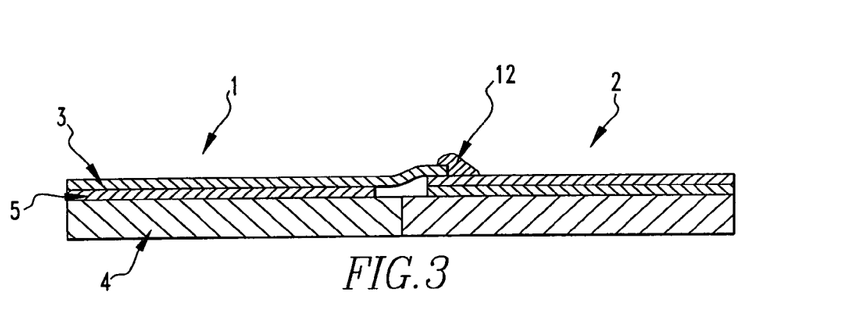
FIG. 3 shows another embodiment of the invention where a lap joint is used.

FIG. 3 shows a single lap weld (12). This approach has the advantage of requiring less Ta powder to make the weld (there is no gap to fill) but has the disadvantage that once the steel structure is welded, the larger (upper) piece of tantalum has to be bent and hammered down flat over the lower (smaller) piece of tantalum (another labor operation).

Figure 4:
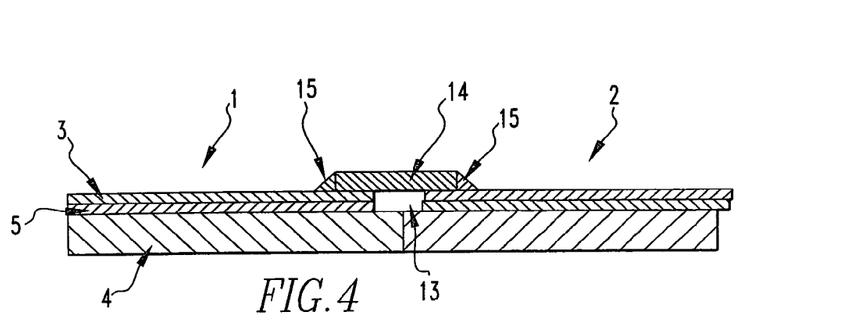
FIG. 4 shows another embodiment of the invention where a double lap joint is used.

FIG. 4 shows another embodiment wherein a double lap weld (15) is employed. This approach eliminates the bending and hammering operation required by the embodiment shown in FIG. 3, but does use more powder and requires a tantalum batten, 13, to fill the gap formed by the exposed steel portions and a tantalum sheet, 14, to join the two tantalum sections.

To simulate the joining of two tantalum clad steel plates in a reactor vessel, a 0.020" thick tantalum sheet was bonded to a nominal ⅜" steel plate, using a high temperature, silver-copper eutectic braze (Bag-8, commercially available from Lucas Milhaupt of Cudahy Wis.). Then a groove was milled approximately 0.022" deep and nominally 0.20" wide down the length of the tantalum cladding to simulate the gap that would be left between the tantalum sheets after welding of the steel plate. Next using nitrogen gas preheated to 600° C. at a stagnation pressure of 3 MPa, tantalum powder 15-30 microns in size (Amperit #151, special grade, commercially available from H.C. Starck Inc.) was deposited. Standoff distance of the nozzle was 30 mm and the powder feed rate was approximately 50 g/min. A cold sprayed weld of approximately 0.040 to 0.060" thick was used to coat the steel, and seal the gap between the tantalum cladding. The cold sprayed tantalum completely filled the gap between the two sheets providing a continuous protective layer of tantalum over both the steel and the tantalum sheet. The cold spray nozzle or gun used was a Kinetiks 4000 commercially available from Cold Gas Technology GmbH, Ampfing, Germany.

While it is well known that sheet tantalum will provide an impervious, protective barrier, this is not always true of powder based coatings. In order for the powder based coating to be protective, it must not only in itself resist corrosive attack but it must also be sufficiently dense (with no interconnected porosity) to prevent percolation by the acids through the coating. Typically for a coating to prevent percolation via interconnected porosity, the coating must be greater than 95% dense. In the tests conducted, the cold sprayed tantalum coating densities were typically greater than 97.5%.

To further prove the impervious nature of the coating, an approximate 0.015" thick tantalum coating was sprayed on nominal 2"×2" mild steel sheet. The same process parameters and equipment used above were used to make these coatings, with the exception that the final coating was approximately 0.014" thick. The tantalum coated side of the steel was then exposed to a 20% hydrochloric acid solution maintained at 70° C. for a period of 4 weeks. When compared to a tantalum sheet that was exposed to the same acid for the same period of time, the cold sprayed tantalum coating resisted the acid as well as the tantalum sheet. In fact in both cases the measured corrosion rates for both the sheet and the coating were less than 0.01 mm/year. After exposure to the acid test, porosity was almost nonexistent, was certainly not interconnected and the coating acted as an impervious barrier to the acid as is evidenced by the complete lack of corrosion build up between the coating and the steel.

Figure 5:
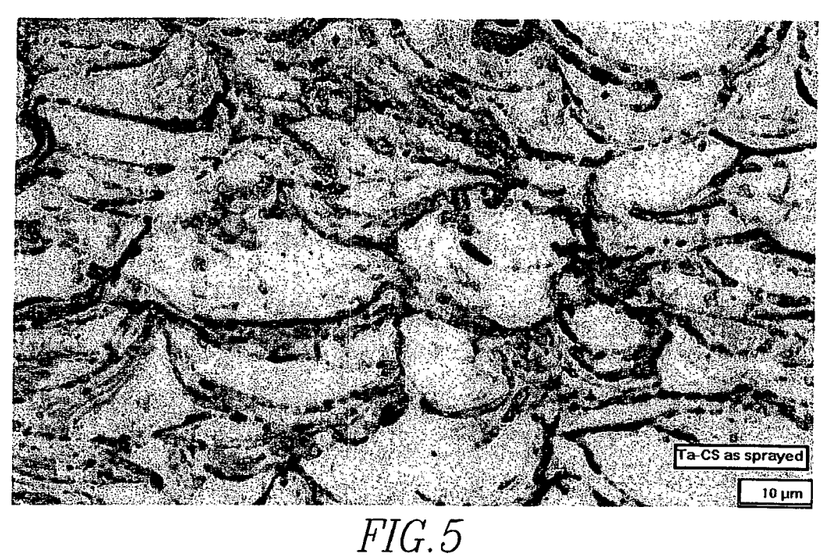
FIG. 5 is a micrograph of a cross section of a tantalum cold sprayed joint that has been etched to reveal prior particle boundaries.

Further, the cold sprayed joint is unique in that it produces no heat affected zone ("HAZ") around the weld compared to thermally induced fusion processes. HAZ is well known and understood by those skilled in the art. In thermally induced fusion bonding, the practice is to carefully minimize potential deleterious effects associated with the HAZ such as excessive directional and crystallographically preferred grain growth. FIG. 5 is a micrograph of a cross section of a tantalum cold sprayed joint that has been etched to reveal the prior particle boundaries ("PPB"). The powder that was used in the spray process was made by the hydride/dehydride process which produces a blocky approximately equiaxed powder (defined as powder having an aspect ratio of approximately 1). The PPBs in FIG. 5 are not equiaxed. In fact they are typically elongated in shape with an aspect ratio of 2 to 3 normal to the direction of spray (it is expected that in the future, as higher gas velocities and higher particle and gas temperatures are used, aspect ratios up to 6 may be obtained). Additionally by using electron beam back scattered diffraction ("EBSD"), it can be shown that the crystallographic orientation of the weld material is completely random. The combined properties of the complete absence of a HAZ with elongated shaped grains, normal to the direction of spray, having a completely random crystallographic orientation are a unique characteristic of a cold sprayed joint.

Figure 6:
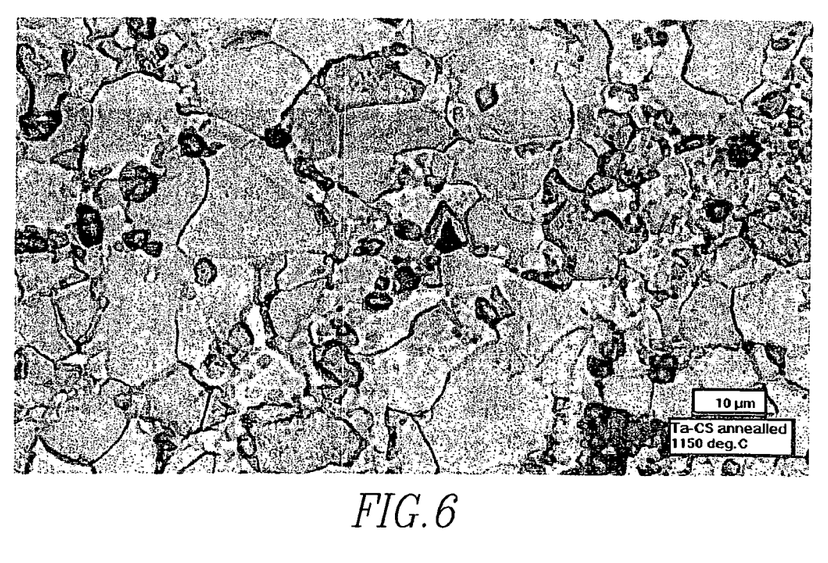
FIG. 6 shows the same cross section as shown in FIG. 5 after annealing at 1150° C. for one and a half hours.

There may be some circumstances in which it is desirable to heat treat an as sprayed joint post spraying either to relieve some of the mechanical stresses or to improve interparticle bond strength. This heat treatment can result in recrystallization which results in equiaxed grains of approximately the same size as the original powder particles. FIG. 6 is a micrograph of the same joint as shown in FIG. 5 that has been annealed at 1150° C. for 1.5 hours. The new equiaxed grains retain the near perfect random crystallographic orientation displayed in the original as sprayed structure as can be shown by EBSD analysis. Again the joint has a unique structure of fine, non-directional equiaxed grains that have a random crystallographic orientation.

While certain procedures have been illustrated or described herein, it will be recognized that variations can be used without departing from the basic teachings herein.

What is claimed is:

1. A method of joining protective cladding layers over an underlying steel layer without the use of batten strips, the method comprising:
    bonding a first protective layer to an underlying steel layer at an interface between the first protective layer and the steel layer;
    bonding a second protective layer to the steel layer at an interface between the second protective layer and the steel layer, the steel layer underlying the second protective layer;
    disposing a portion of the first protective layer over a portion of the second protective layer, thereby forming a region of overlap; and
    thereafter, and without otherwise bonding the first protective layer to the second protective layer in the region of overlap, cold spraying a metal powder over and in contact with the first and second protective layers in the region of overlap to form a layer of unmelted metal powder that directly connects the first and second protective layers.

2. The method of claim 1, wherein the first and second protective layers each comprise at least one of tantalum, niobium, titanium, zirconium, molybdenum, or tungsten.

3. The method of claim 1, wherein the first and second protective layers are not welded together before cold spraying the metal powder.

4. The method of claim 1, wherein the first and second protective layers are substantially resistant to at least one of acid or corrosion.

5. The method of claim 1, wherein the steel layer underlies substantially all of the first and second protective layers.

6. The method of claim 1, wherein after cold spraying the layer of unmelted metal powder is substantially free of oxygen.

7. The method of claim 1, wherein each of the first and second protective layers is bonded directly to the steel layer.

8. The method of claim 7, wherein bonding both of the first and second protective layers to the steel layer comprises at least one of diffusion bonding or explosive bonding.

9. The method of claim 1, wherein at least one of the first or second protective layers is bonded to the steel layer via a structural adhesive, a low-temperature brazing material, or a low-temperature solder.

10. The method of claim 9, wherein the at least one of the first or second protective layers is bonded to the steel layer via a structural adhesive having a decomposition temperature less than approximately 300° C.

11. The method of claim 9, wherein the at least one of the first or second protective layers is bonded to the steel layer via a low-temperature solder having a melting point less than approximately 400° C.

12. The method of claim 1, wherein bonding the second protective layer to the underlying steel layer comprises cold spraying the second protective layer over the steel layer.

13. The method of claim 1, wherein a thickness of at least one of the first or second protective layers ranges between approximately 0.005 inches and approximately 0.02 inches.

14. The method of claim 1, wherein a thickness of at least one of the first or second protective layers ranges between approximately 0.005 inches and approximately 0.01 inches.

15. The method of claim 1, wherein the layer of unmelted metal powder comprises elongated particles having a random crystallographic orientation.

16. The method of claim 1, wherein the layer of unmelted metal powder has a density greater than approximately 95%.

17. The method of claim 16, wherein the layer of unmelted metal powder has a density greater than approximately 97.5%.

18. The method of claim 1, further comprising annealing the layer of unmelted metal powder for at least one of relieving mechanical stress or improving interparticle bond strength.

19. The method of claim 18, wherein the annealing recrystallizes at least a portion of the layer of unmelted metal powder.

20. The method of claim 18, wherein the annealing is performed at a temperature greater than approximately 1150° C.

21. The method of claim 1, wherein the steel layer comprises stainless steel.

22. The method of claim 1, wherein after cold spraying the layer of unmelted metal powder and the first and second protective layers are substantially free of impurities diffused therein from the steel layer.

23. The method of claim 1, further comprising, prior to forming the region of overlap, joining two steel members to form the underlying steel layer, thereby forming a joint, wherein the region of overlap is disposed proximate the joint.

24. The method of claim 23, wherein joining the two steel members comprises welding.

\* \* \* \* \*